United States Patent
Gorges et al.

(10) Patent No.: US 10,041,538 B2
(45) Date of Patent: Aug. 7, 2018

(54) BEARING ELEMENT AND METHOD OF MANUFACTURING A BEARING ELEMENT

(71) Applicants: Mahle International GmbH, Stuttgart (DE); Mahle Engine Systems UK Ltd, Warwickshire (GB)

(72) Inventors: Roger Gorges, Birmingham (GB); James P. De Blaquiere, Derby (GB); Natalie Phipps, Northampton (GB)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 0 days.

(21) Appl. No.: 15/101,927

(22) PCT Filed: Dec. 5, 2014

(86) PCT No.: PCT/EP2014/076752
§ 371 (c)(1),
(2) Date: Jun. 5, 2016

(87) PCT Pub. No.: WO2015/082697
PCT Pub. Date: Jun. 11, 2015

(65) Prior Publication Data
US 2016/0312827 A1     Oct. 27, 2016

(30) Foreign Application Priority Data

Dec. 6, 2013 (GB) .................................. 1321671.8

(51) Int. Cl.
*F16C 17/02* (2006.01)
*F16C 9/02* (2006.01)
(Continued)

(52) U.S. Cl.
CPC .............. *F16C 33/206* (2013.01); *F16C 9/02* (2013.01); *F16C 9/04* (2013.01); *F16C 17/022* (2013.01);
(Continued)

(58) Field of Classification Search
CPC .. F16C 9/02; F16C 9/04; F16C 17/022; F16C 33/201; F16C 33/203; F16C 33/206;
(Continued)

(56) References Cited

U.S. PATENT DOCUMENTS 2,159,327 A * 5/1939 Hendrick ................ F16C 33/12
                                                       267/269
4,623,590 A * 11/1986 Hodes ...................... C08K 7/02
                                                       428/408
(Continued)

FOREIGN PATENT DOCUMENTS

CN          102272468 A     12/2011
DE       102008055194 A1      7/2010
(Continued)

OTHER PUBLICATIONS

English abstract for DE-102010035528, Mar. 6, 2016.
(Continued)

*Primary Examiner* — Marcus Charles
(74) *Attorney, Agent, or Firm* — Fishman Stewart PLLC (57) ABSTRACT

A bearing element may include a bearing element substrate and a sliding layer applied to a surface of the bearing element substrate. The sliding layer may be formed of a sliding layer material. A surface roughness (Ra) of the surface of the bearing element substrate may be less than 1 µm. The sliding layer material may include a polymeric material and iron oxide. The sliding layer may have at least three layers of the sliding layer material.

29 Claims, 7 Drawing Sheets

(51) Int. Cl.
*F16C 9/04* (2006.01)
*F16C 17/06* (2006.01)
*F16C 33/20* (2006.01)
*F16C 27/06* (2006.01)

(52) U.S. Cl.
CPC .......... *F16C 27/063* (2013.01); *F16C 33/201* (2013.01); *F16C 33/203* (2013.01); *F16C 33/208* (2013.01); *F16C 2206/42* (2013.01); *F16C 2208/42* (2013.01); *F16C 2208/44* (2013.01); *F16C 2223/42* (2013.01); *F16C 2240/48* (2013.01); *F16C 2240/54* (2013.01); *F16C 2240/60* (2013.01); *F16C 2360/18* (2013.01)

(58) Field of Classification Search
CPC ............... F16C 33/208; F16C 2206/42; F16C 2208/42; F16C 2208/44; F16C 2223/42; F16C 2240/48; F16C 2240/54; F16C 2240/60; F16C 2360/18; F16C 27/063
USPC ........ 384/129, 297, 275–276, 281–292, 397, 384/912; 428/329, 334, 337, 565, 681, 428/687
See application file for complete search history.

(56) References Cited

U.S. PATENT DOCUMENTS

| | | | | |
|---|---|---|---|---|
| 6,905,779 B2* | 6/2005 | Sakai | .................... | B22F 1/0003 384/910 |
| 8,551,569 B2 | 10/2013 | Adam et al. | | |
| 8,679,641 B2* | 3/2014 | Saxton | ..................... | B22F 7/08 419/10 |
| 9,022,656 B2* | 5/2015 | Burgeff | ................. | F16C 27/063 384/276 |
| 2003/0185474 A1* | 10/2003 | Tanaka | .................. | F16C 33/201 384/297 |
| 2006/0251887 A1* | 11/2006 | Welsch | ................. | F16C 27/063 428/339 |
| 2008/0159671 A1* | 7/2008 | Leonardelli | .............. | B05D 5/08 384/129 |
| 2008/0248269 A1* | 10/2008 | Shibuya | .................. | B05D 5/08 428/215 |
| 2011/0268944 A1* | 11/2011 | Adam | ....................... | F16C 9/00 428/216 |
| 2015/0018254 A1* | 1/2015 | Araujo | ....................... | F16J 9/26 508/105 |
| 2015/0125101 A1* | 5/2015 | Kachoosangi | ........ | F16C 33/201 384/129 |

FOREIGN PATENT DOCUMENTS

| | | | | |
|---|---|---|---|---|
| DE | 102010035528 A1 | | 3/2012 | |
| DE | 102014213822 A1 * | | 1/2016 | ........... C23C 28/322 |
| EP | 0093870 A2 | | 11/1983 | |
| JP | 2005-201289 A | | 7/2005 | |
| JP | 2011-126750 A | | 6/2011 | |
| WO | WO-97/38046 A1 | | 10/1997 | |
| WO | WO-2009/084072 A1 | | 7/2009 | |
| WO | WO-2010076306 A1 | | 7/2010 | |
| WO | WO-2014180916 A1 * | | 11/2014 | ........... F16C 33/102 |

OTHER PUBLICATIONS

GB search report for 1321671.8 dated Jul. 1, 2014.
International Search Report for PCT/EP2014/076752, dated Jun. 12, 2015.
Chinese Office Action dated 10-27017.
English Abstract of CN 102272468A.

* cited by examiner

BEARING ELEMENT AND METHOD OF MANUFACTURING A BEARING ELEMENT

CROSS-REFERENCE TO RELATED APPLICATIONS

This application claims priority to British Patent Application No. 1321671.8, filed Dec. 6, 2013, and International Patent Application No. PCT/EP2014/076752, filed Dec. 5, 2014, both of which are hereby incorporated by reference in their entirety.

TECHNICAL FIELD

The invention relates to a bearing element. The invention also relates to a method of manufacturing a bearing element.

Bearing elements embodying the present invention are particularly suitable for use in automotive environments, including for supporting rotatable engine components and for use as, or as part of, thrust washers and flange bearing assemblies.

BACKGROUND

Bearing elements are generally known which comprise a steel back, a substrate layer and a sliding layer (or overlay or running layer). These are commonly used in engines, for example as crankshaft and/or camshaft supporting bearings and big end bearings and small end bushings in connection rods. They may also be used as thrust washers (axial bearings).

The sliding layer is made from a sliding layer material, which may be a metal layer, comprising, for example, lead, tin, bismuth, silver, copper alloys or aluminium alloys. The sliding layer may be applied to a substrate by galvanic processes, vaporisation or mechanical plating. Alternatively, the sliding layer material may be a non-metal material comprising an artificial resin base, or matrix, and an additive for enhancing the load carrying capacity and/or wear resistance of the bearing.

It is generally known that wear of the sliding layer material can lead to exposure of the substrate material to which the sliding layer material is applied. This can lead to failure of the bearing element due to seizure.

Research in the field of bearing elements has resulted in the use of a wide range of compositions of sliding layer materials, many incorporating relatively harder particles, particularly where the bulk of the sliding layer material is an artificial resin base or matrix, with the intention of providing the bearing element with enhanced wear resistance. There has some been interest in the use of iron oxides in sliding layer materials as discussed in the following prior art patents and applications.

Published international patent application number WO9738046 in the name of Glyco Metall Werke describes the use of sliding layer materials predominantly consisting of thermoplastic fluoropolymers to which iron oxide is added to increase the resistance to wear of the sliding layer material.

Published Japanese patent application JP2005201289 to Toyota Motor Corp. et al. claims to provide a composite sliding layer formation which does not require preheating a base material. The application refers to the use of hard particles, including iron oxide ($Fe_2O_3$), which may be included in the sliding layer to act as a friction modifier and wear inhibitor.

U.S. Pat. No. 8,551,569 granted to Federal-Mogul Wiesbaden GmbH describes a method for producing a sliding element having a metal base material that is provided with a sliding layer having a thickness of more than 50 μm. To make the sliding element, the base material is coated with a paste of the sliding layer material that contains at least one high-temperature polymer in addition to a fluoropolymer, and the coated base material is subjected to a thermal treatment. The paste may contain a wear-reducing additive, such as iron (III) oxide.

Published international patent application number WO2010076306 in the name of Federal-Mogul Wiesbaden GmbH describes a sliding element having a substrate and a sliding layer material applied to the substrate. The sliding layer material comprises at least one cross-linkable binder or at least one high-melting thermoplastic material or is of a material that contains a matrix of at least one high-melting thermoplast material or at least one "Duroplast" material. The sliding layer material contains $Fe_2O_3$ with a preferred volume percentage fraction of 0.1 to 15 vol. %. The substrate to which the sliding layer material is applied has a particularly preferred surface roughness ($R_z$) of 3 to 8 μm where $R_z$ is understood to be the surface roughness according to DIN EN ISO 4287:1998.

Federal-Mogul Wiesbaden GmbH sells crankshaft bearings and conrods under the trade name "IROX" which comprise a substrate and an overlay (sliding layer material) consisting of polyamide imide (PAI) and $Fe_2O_3$ particles.

The applicant for the present invention has found that existing attempts to use iron oxides in sliding layer materials have resulted in bearing elements which have a number of limitations and which are not optimised for certain applications in automotive environments. For example, known bearing elements comprising $Fe_2O_3$ are prone to some or all of the following drawbacks: sagging of the sliding layer material; variation of the sliding layer material thickness across the surface of the substrate; and contamination of the sliding layer material, for example contamination with grit particles which have been used to roughen the surface of the substrate prior to application of the sliding layer material.

The applicant has also found that in known bearing elements, the surface of the substrate to which the sliding layer material is applied is relatively coarse, having, a particularly preferred surface roughness (Rz) of 3 to 8 μm, or higher. This may result in the formation of large exposed peaks or asperities of the underlying bearing materials as the sliding layer material wears. This may lead to excessive metal-to-metal contact and is highly undesirable.

SUMMARY

In the following description, the term "surface roughness" is used to refer to the surface roughness of the surface of the bearing element substrate as measured according to DIN EN ISO 4287:2010-07. The following description refers to "Ra" and "Rz" values which are to be interpreted in accordance with this standard.

According to Section 4.2.1 of DIN EN ISO 4287:2010-07 ("arithmetical mean deviation of the assessed"), Ra is the "arithmetical mean deviation of the assessed profile—the arithmetic mean of the absolute ordinate values Z(x) within a sampling length" and is calculated by the following formula:

$$Pa, Ra, Wa = \frac{1}{l}\int_0^l |Z(x)|dx$$

with $l = lp$, $lr$ or $lw$ according to the case.

Figure 1:
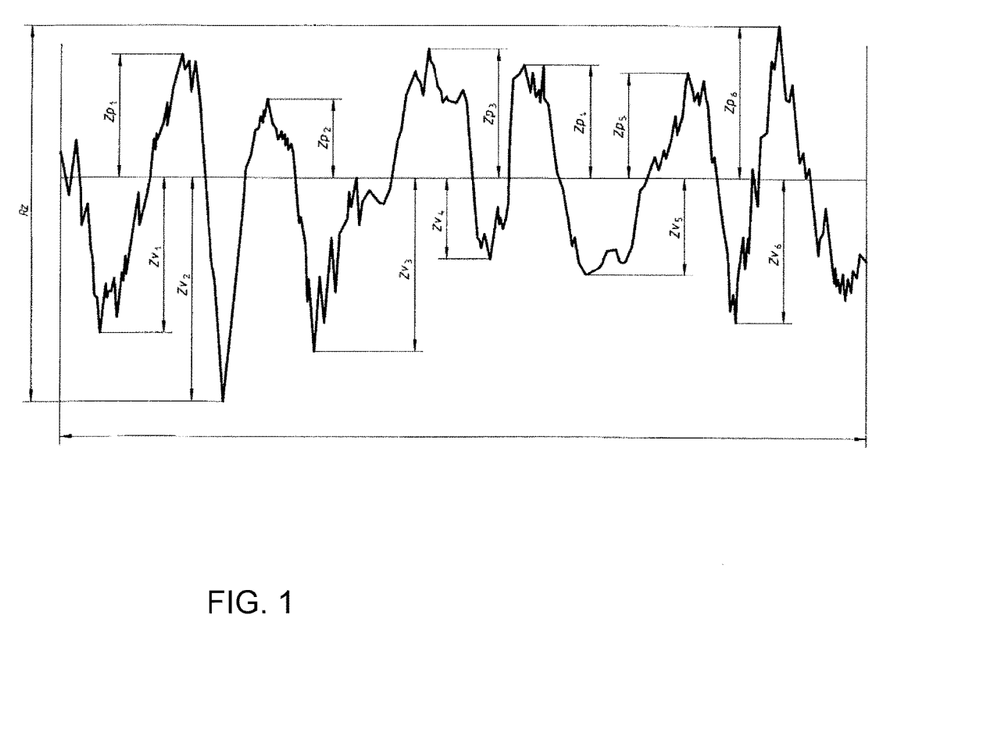
FIG. 1 is a diagram taken from DIN EN ISO 4287:2010-07 (FIG. 8 of that standard) showing the measurement of Rz roughness values of the surface of a bearing element embodying the present invention.
Figure 2:
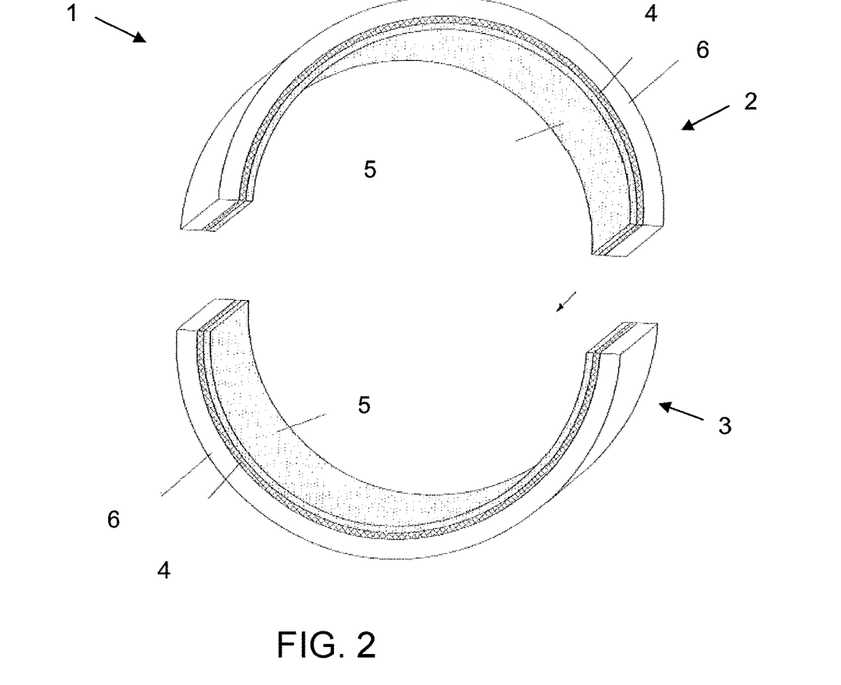
FIG. 2 shows a pair of semi-cylindrical bearing elements embodying the present invention.

According to Section 4.1.3 of the DIN EN ISO 4287: 2010-07 ("maximum height of profile"), Rz is the "sum of height of the largest profile peak height Zp and the largest profile valley depth Zv within a sampling length" (i.e. peak to peak)—see FIG. 1.

The present invention is defined in the appended independent claims and provides, in a first aspect, a bearing element, comprising: a bearing element substrate; and a sliding layer applied to a surface of the bearing element substrate, the sliding layer being formed of a sliding layer material; wherein a surface roughness (Ra) of the surface of the bearing element substrate is less than 1 µm; wherein the sliding layer material comprises: a polymeric material; and iron oxide; and wherein the sliding layer comprises at least three layers of the sliding layer material.

Some preferred features of the present invention are set out in the dependent claims to which reference should now be made.

A bearing element embodying the present invention may advantageously provide high load carrying capacity and enhanced wear resistance making it suitable for applications involving high temperatures and movement or rotation of components at high speeds, among others.

A bearing element embodying the present invention may advantageously have a lower surface roughness of the surface of the substrate than known bearing elements. This means that wear of the sliding layer material may less readily result in exposed peaks or asperities of the substrate material and therefore a reduction in rapid wear caused by contact between the substrate material and a moving component in contact with the bearing.

In the prior art, it has been a skilled person's understanding that a higher level of roughness of the surface of the substrate is required to provide mechanical support for the sliding layer material. However, the inventors have found that with sliding layer materials embodying the present invention, lower surface roughnesses of the surface of the substrate can be used and that this may extend the lifetime of a bearing element embodying the present invention compared to that of known bearing elements.

It is the inventors' understanding that the fact that the sliding layer material is applied to the bearing element substrate (or an intermediate layer, if present) in at least three layers provides improved thickness control and more uniform thickness of the sliding layer material over the surface of the bearing element substrate compared to known sliding layer materials containing $Fe_2O_3$. The known prior art, discussed above, only contemplates the use of one or two layers.

Bearing elements embodying the invention may be particularly suitable for use in fluid-lubricated applications. Particularly advantageous applications for the bearing elements are as sliding bearings in combustion engines, for example crankshaft and/or camshaft supporting bearings, big end bearings and small end bushings. Bearing elements embodying the invention are particularly suitable for use in vehicle engines, including those equipped with stop-start engine technology in which the engine is subjected to a substantially greater number of starts over the life of the engine than in conventional engines and in which the crankshaft is regularly accelerated from rest before a uniform hydrodynamic film of lubricant is established on the bearing/running surface.

Bearing elements embodying the invention may also be used to form any of a number of sliding surfaces on engine components including bushes, piston skirts, piston rings, liners, camshafts and conrods. They may also be used as, or as part, of any of thrust washers, flanges and half liners. Other suitable applications are envisaged and will be readily apparent to the skilled person.

It may be beneficial if a surface of the bearing element substrate has a surface roughness (Ra) which is between 0.5 µm and 1 µm or which is less than 0.5 µm. It may also be beneficial if a surface of the bearing element substrate has a surface roughness (Ra) which is greater than 0.01 µm or greater than 0.05 µm or greater than 0.1 µm.

Preferably, a surface roughness (Rz) of the surface of the bearing element substrate is less than 3 µm. It may be beneficial if a surface roughness (Rz) of the surface of the bearing element substrate is less than 2.5 µm or less than 2 µm or less than 1.5 µm or less than 1 µm.

Preferably, the sliding layer material comprises $Fe_2O_3$. Alternatively, or additionally, the sliding layer material may comprise one or both of FeO and $Fe_3O_4$.

The sliding layer material may comprise iron oxide in powder form. In this case, the sliding layer material preferably comprises iron oxide particles having an average particle size (or d50) of between 0.5 µm and 10 µm.

The sliding layer material may alternatively comprise iron oxide in flaked form. In this case, the sliding layer material preferably comprises iron oxide flakes having an average particle size of between 0.5 µm and 15 µm and/or the iron oxide flakes preferably have an average aspect ratio of about 1:4. In each case, the maximum iron oxide particle size should be less than 15 µm, or 10 µm, or 5 µm, or 3 µm, or less than the thickness of the layer of sliding layer material in which the material is deposited, and the minimum iron oxide particle size may advantageously be greater than 0.1 µm, or 0.5 µm or 1 µm.

Preferably, the thickness of each of the at least three layers of the sliding layer material is substantially equal. Alternatively, it may be advantageous for the thickness of any two of the at least three layers of the sliding layer material to be substantially equal and different to the thickness of the third layer of the sliding layer material. In a further alternative, it may be advantageous for the thickness of each of at least three layers of the sliding layer material to be different (i.e. layer having a thickness which is different from the thickness of each of the other layers).

Preferably, the total thickness of the sliding layer material is between about 3 µm and about 12 µm. More preferably, the total thickness of the sliding layer material is between about 8 µm and about 10 µm.

Preferably, the bearing element further comprises a steel back underlying the bearing element substrate to provide additional hoop stress and rigidity.

Preferably, the bearing element substrate comprises an iron, aluminium or copper alloy or bronze or brass. These bearing element substrate materials may provide good running surfaces in an emergency situation so that, for example, if the polymer were to wear away rapidly, the bearing element may not seize immediately.

Preferably, the polymeric material comprises polyamide imide (PAI). Other suitable polymer bases include: polyimides; polyamides; epoxy; epoxy resins; phenolic or polybenzimidazole (PBI); or a combination of any of these materials. Such polymeric materials may advantageously provide high temperature, wear and chemical resistance.

Preferably, at least one of the at least three layers of the sliding layer material comprises a different volume percentage of iron oxide than at least one other layer of the sliding layer material.

The percentage volume of iron oxide in a middle layer (not the bearing surface layer or the layer adjacent to the bearing element substrate, i.e. the outer layers) of the sliding layer material may be different (higher or lower) to the percentage volume of iron oxide in at least one of the outer layers of the sliding layer material.

Preferably, the percentage volume of iron oxide in the sliding layer material is higher in the layer adjacent to the substrate than in the layer forming the bearing surface, the percentage volume in the, or each, intermediate layer preferably being equal to or between the higher and lower percentage volumes. Alternatively, the percentage volume of iron oxide in the sliding layer material decreases with each layer from the substrate. In other words, the layer in contact with the substrate contains the highest volume percentage iron oxide and the layer forming the bearing surface contains a lower, or the lowest, volume percentage of iron oxide. This may advantageously provide a bearing in which the hardness of the sliding layer material increases and the associated wear resistance progressively increases as the sliding layer material wears.

In a second aspect, the present invention may also provide a method of manufacturing a bearing element, comprising the steps of: providing a bearing element substrate; roughening the surface of the bearing element substrate such that a surface of the bearing element substrate has a surface roughness (Ra) which is less than 1 µm; providing a sliding layer material comprising: a polymeric material; and iron oxide; applying the sliding layer material to the bearing element substrate to form a sliding layer, wherein the sliding layer material is applied to the bearing element substrate in at least three passes, each pass comprising the steps of: applying a layer of the sliding layer material to the bearing element substrate; and drying the layer of the sliding layer sliding layer material; and curing the sliding layer material.

Applying the sliding layer material in at least three passes or applications to form at least three layers of the sliding layer material may advantageously allow the thickness of each layer of the sliding layer material to be less than if the sliding layer material were applied in a single pass or application or a series of two passes or applications. It may also help to prevent sagging or running of the sliding layer material and/or to provide more uniform thickness of the sliding layer material over the bearing element substrate.

It may be beneficial if a surface of the bearing element substrate is prepared so as to have a surface roughness (Ra) which is between 0.5 µm and 1 µm or which is less than 0.5 µm. It may also be beneficial if a surface of the bearing element substrate is prepared so as to have a surface roughness (Ra) which is greater than 0.01 µm or greater than 0.05 µm or greater than 0.1 µm.

Preferably, the surface of the bearing element substrate is roughened such that a surface of the bearing element substrate has a surface roughness (Rz) which is less than 3 µm. It may be beneficial if the surface of the bearing element substrate is roughened such that a surface of the bearing element substrate has a surface roughness (Rz) which is less then 2.5 µm or less than 2 µm or less than 1.5 µm or less than 1 µm.

Preferably, each pass of the bearing element substrate results in substantially dry-to-touch parts. This can help to ensure more uniform thickness of each layer of the sliding layer material over the bearing element substrate.

Preferably, the sliding layer material is sprayed onto the bearing element substrate.

Preferably, the sliding layer material is sprayed onto the bearing element substrate by a spray lance (or nozzle) which is rotated relative to the element substrate substrate. Rotating the spray lance relative to the substrate can ensure greater control over the spraying operation than other spraying geometries.

Preferably, a plurality of semi-cylindrically shaped bearing element substrates is arranged so as to form a hollow, substantially cylindrical, stack of bearing element substrates with their bearing surfaces facing inwards. Preferably, the rotating spray lance is advanced linearly along, and within, the cylindrical stack so as to apply the sliding layer material to the bearing element substrates of the plurality of bearing elements in a single pass or operation, or simultaneously. Preferably, the cylindrical stack of bearing elements is positioned vertically and the rotating spray lance is advanced vertically, and within, the stack.

Rotating the spray lance relative to the stack of bearing elements can ensure greater control over the spraying operation as the rotating lance may have a lower inertia and/or momentum than if the stack of bearing elements were to be rotated around the lance.

Preferably, the spray lance is angled at between about 30 and about 70 degrees to the normal to the column of bearing element substrates Preferably, a spray cone produced by the spray lance is divided equally by the normal to the surface of the bearing element substrates.

Preferably, the spray direction from the rotating spray lance forms a spray angle covering between about 30 and about 70 degrees to normal to the surface of the substrate. Preferably, the spray cone is symmetrically divided by the normal to the surface of the substrate so that, for example, a 50° spray angle would form a spray cone covering about 25° on either side of the normal. This may provide improved thickness control of the sliding layer material.

Preferably, the rotating spray lance is advanced linearly along the cylindrical stack at variable velocity, advantageously controlled according to a predetermined velocity profile. This may provide improved thickness control of the sliding layer material and reduce sagging or running of the sliding layer material.

Preferably, the method may further comprise a step of indexing (moving through a predetermined angle of rotation) the cylindrical stack or bearing elements between each spraying event. This may provide improved thickness control of the sliding layer material and reduce sagging or running of the sliding layer material.

Preferably, the rotating spray lance is rotated at between about 500 and about 1500 rpm. More preferably, the rotating spray lance is rotated at about 1000 rpm. This may provide improved thickness control of the sliding layer material and reduce sagging or running of the sliding layer material.

Preferably, the thickness of each of the at least three layers of the sliding layer material is substantially equal. Alternatively, it may be advantageous for the thickness of any two of the at least three layers of the sliding layer material to be substantially equal and different to the thickness of the third layer. In a further alternative, it may be advantageous for the thickness of each of at least three layers of the sliding layer material to be different (i.e. each layer have a different thickness to each other layer).

Preferably, at least one of the at least three layers of the sliding layer material comprises a different percentage by volume of iron oxide than at least one other layer of the sliding layer material.

The percentage volume of iron oxide in a middle layer of the sliding layer material may be different to the percentage volume of iron oxide in at least one outer layer of the sliding layer material. The percentage volume of iron oxide in the sliding layer may decrease with each layer of the sliding layer material from the substrate.

Preferably, the method further comprises the step of degreasing the surface of the bearing element substrate.

Preferably, the method further comprises the step of washing the surface of the bearing element substrate.

Preferably, the method further comprises the step of pre-heating the bearing element substrate before at least one pass of the bearing element substrate.

Preferably, the method further comprises the step of pre-heating of the sliding layer material before at least one pass of the bearing element substrate.

It should be appreciated that any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In an alternative invention, a surface roughness (Rz) of the surface of the bearing element substrate may be less than 1 μm and a surface roughness (Ra) of the surface of the bearing element substrate may have any value. In this invention, it may be beneficial if the surface of the bearing element substrate is roughened such that a surface of the bearing element substrate has a surface roughness (Rz) which is less than 1 μm and greater than 0.01 μm or 0.05 μm or 0.1 μm.

BRIEF DESCRIPTION OF THE DRAWINGS

Some example embodiments of the present invention will now be described with reference to the accompanying drawings, in which.

DETAILED DESCRIPTION

Figure 3:
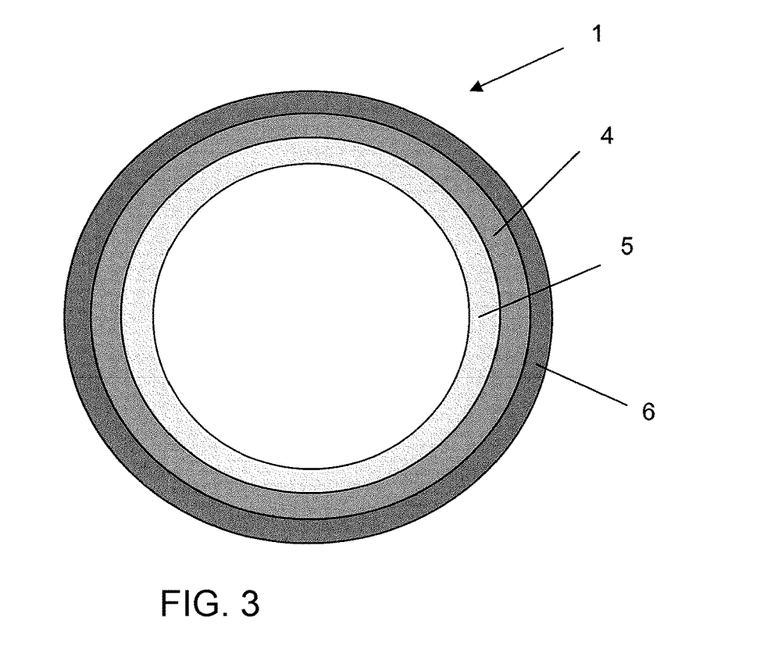
FIG. 3 shows a cylindrical bearing element formed by the pair of the semi-cylindrical bearing elements of FIG. 2.

In an example embodiment of the present invention, and with reference to FIGS. 2 to 5, a bearing element 1, which may be used to support a rotatable shaft in an engine, may be formed as a pair of semi-circular or semi-cylindrical bearing elements 2, 3 (bearing shells) which may be brought together to form a substantially continuous, circular or cylindrical, bearing element (FIG. 3). Many alternative shapes and configurations of the bearing element are envisaged and will be readily apparent to the skilled person.

The bearing element comprises a substrate 4 and a sliding layer material 5 which is applied to and supported by the substrate. The bearing element may also be provided with a steel backing 6 underlying the substrate to provide increased stiffness and hoop strength.

The substrate is preferably made from a metallic material to give the bearing element greater structural rigidity. Suitable substrate materials include aluminium, bronze, brass, bismuth, copper, nickel, tin, zinc, silver, gold and iron, or alloys of such materials. The substrate may comprise a combination of two or more such materials or alloys. Particularly suitable substrate materials for bearing elements embodying the present invention include iron, aluminium, copper alloy, bronze, and brass alloys.

Optionally, the substrate may comprise an intermediate layer which may provide an improved surface for adhesion of the sliding layer material when certain supporting bearing element materials are used. Suitable materials for the optional intermediate layer include nickel, silver, copper and/or iron or alloys comprising one or more of such materials. The optional intermediate layer may comprise a combination of two or more or such materials/alloys. The intermediate layer may also include an adhesion promoter and/or be subjected to a pre-treatment, for example a phosphating, chromating or silicating treatment.

The sliding layer material is formed on the underlying substrate to give the bearing element the desired bearing characteristics e.g. the desired load carrying capacity and wear resistance. The matrix of the sliding layer material (which generally provides the highest volume percentage portion of the sliding layer material) is formed of a polymeric material. Examples of suitable polymeric materials include or may comprise: cross-linkable bonding agents; thermosetting plastics; high melting point thermoplastics; materials having a matrix of at least one high melting point thermoplastic material; fibre-reinforced plastics; any combination of these materials. Other suitable materials are envisaged and will be readily apparent to the skilled person. Particularly suitable polymeric materials include: PAI (polyamide imide); PI (polyimide); epoxy; epoxy resin; PBI (Polybenzimideazole); phenolic resin; silicone resin; or a combination of any of these materials. These materials are characterised by high temperature resistance and excellent media resistance (such as chemical resistance to lubricants).

One particularly preferred polymeric material for bearing elements embodying the present invention is polyamide imide (PAI).

The sliding layer material may optionally include at least one solid lubricant. Suitable solid lubricants include: metal sulphides with layered structures; graphite; hexagonal boron nitride (h-BN); molybdenum disulfide ($MoS_2$); tungsten disulphide ($WS_2$); PTFE; or a combination of any of these materials. Other suitable materials are envisaged and will be readily apparent to the skilled person.

The sliding layer material includes iron oxide. This may provide improved wear resistance compared to a sliding layer material which does not include iron oxide. One particularly preferred iron oxide for bearing elements embodying the present invention is $Fe_2O_3$, which is about twice as hard as other common iron oxides.

The iron oxide, preferably $Fe_2O_3$, may be added to the sliding polymeric material in powdered or particulate form. It is believed that the average particle size (or d50) of the $Fe_2O_3$ is of some significance and that the relationship between the average particle size of the $Fe_2O_3$ particles and the thickness of the sliding layer material may be an important factor in predicting the wear characteristics of the sliding layer material. A preferred average particle size (or d50) of $Fe_2O_3$ particles for bearing elements embodying the present invention is 0.5-10 μm.

The iron oxide may alternatively be added to the polymeric material in flaked form. A preferred average particle size of flaked $Fe_2O_3$ particles for bearing elements embodying the present invention is 0.5-15 μm and a preferred aspect ratio of flaked $Fe_2O_3$ particles for bearing elements embodying the present invention is a minimum aspect ratio of 1:4. Adding the iron oxide to the polymeric material in flaked form so that the flakes are randomly arranged and randomly orientated throughout the polymeric material may serve to provide bearing elements embodying the present invention with higher resistance to propagation of cracks though the sliding layer material than bearing elements in which the iron oxide is added to the polymeric material in powdered form.

The sliding layer material may optionally comprise a combination of an iron oxide in powdered and/or flaked form and one or more other type of hard particle in powdered and/or flaked form. Some suitable hard particles include: nitrides; carbides; borides; oxides; and metal powders. Other suitable materials are envisaged and will be readily apparent to the skilled person. Preferred maximum and/or minimum particle (or flake) sizes are as described above.

Figure 4:
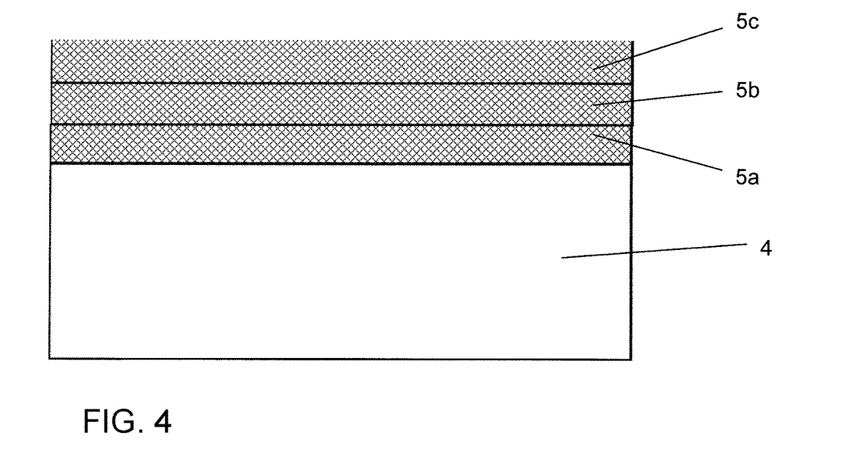
FIG. 4 shows a cross-section through a bearing element embodying the present invention in which the at least three layers of the sliding layer material are of substantially equal thickness.
Figure 5:
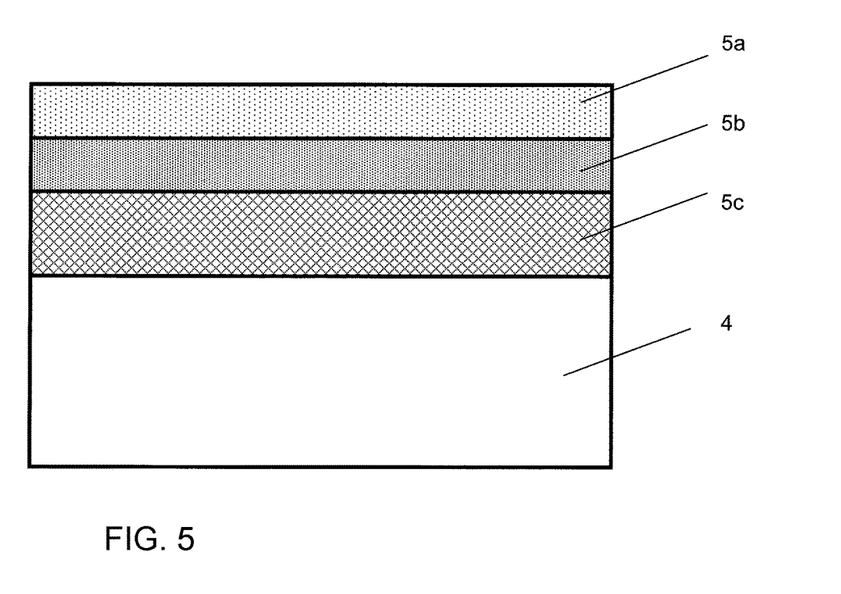
FIG. 5 shows a cross-section through a bearing element embodying the present invention in which the at least three layers of the sliding layer material are of different thicknesses and the percentage volume of iron oxide in each layer of the sliding layer material decreases from the substrate towards the outer (running) surface.

As shown in FIGS. 4 and 5, the sliding layer material is applied to the substrate in at least three layers 5a, 5b, 5c. This enables the desired overall thickness of the sliding layer material to be built up in a series of thinner layers than bearing elements in which the sliding layer material is applied to the substrate in a single layer, or in two layers. Applying the sliding layer material to the substrate in at least three layers has been found to provide improved thickness control, more uniform thickness of the sliding layer material over the underlying bearing substrate and reduced sagging of the sliding layer material.

The sliding layer material 5 may be applied to the substrate in more than three layers. Applying the sliding layer material to the substrate in, for example, four, or five, layers may provide improved thickness control and more uniform thickness compared to that which may be achieved when the sliding layer material is applied to the substrate in three layers. A preferred number of layers of the sliding layer material for bearing elements embodying the present invention is four layers of the of the sliding layer material.

In a modification of the bearing elements described above, each layer of the at least three layers of the sliding layer material may be provided with a different composition to the composition of at least one other layer (see FIG. 5). For example, the percentage by volume of iron oxide particle in the sliding layer material may vary from layer to layer. The percentage by volume of iron oxide particle in the sliding layer material may be higher, or lower, in a central layer between a first outer layer adjacent the substrate and a second outer layer forming the outer (bearing) surface. In this arrangement, the percentage by volume of iron oxide particle in the first outer layer may be the substantially the same as, or different from the percentage by volume of iron oxide particle in the sliding layer material.

In a bearing element embodying the present invention, the percentage by volume of iron oxide decreases with each layer from the substrate so that there is a higher volume percentage in the layer adjacent the substrate and a lower volume percentage in the layer forming the outer (bearing) surface. A bearing element having this construction may offer progressively higher wear resistance as each layer is worn, extending the life of the bearing beyond the life of a bearing in which the percentage by volume of iron oxide is the same in all of the layers of the sliding layer material.

The total thickness of the sliding layer material is preferably between about 3 μm and about 12 μm. A preferred thickness of the sliding layer material for bearing elements embodying the present invention is between about 8 μm and about 10 μm.

Figure 6:
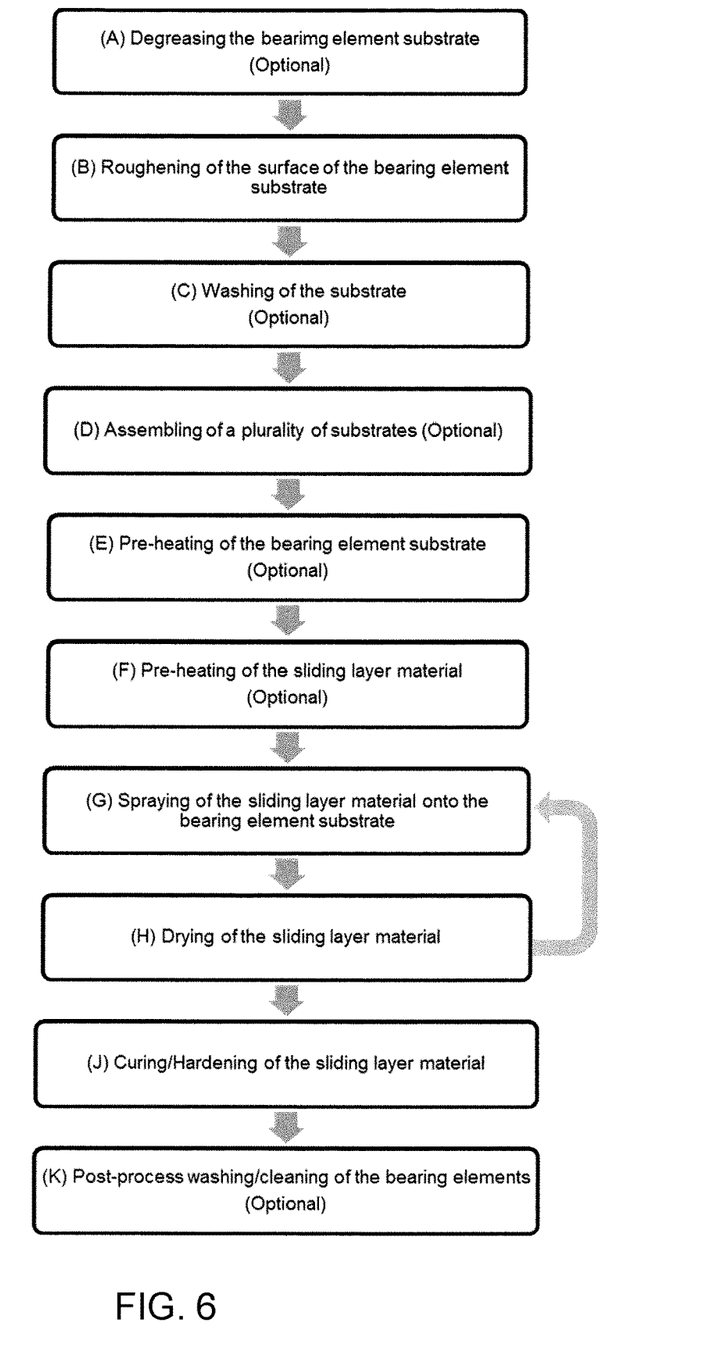
FIG. 6 is a flow diagram showing an overview of a manufacturing process embodying the present invention, in a second aspect.

A process, embodying the present invention in the second aspect, for manufacturing a bearing element embodying the present invention in the first aspect will now be described with reference to FIG. 6. The process comprises some, or all, of the following steps:

A. degreasing the substrate;
    B. roughening the surface of the substrate;
    C. washing the substrate;
    D. assembling of a plurality of substrates for application of the sliding layer material;
    E. pre-heating of the assembled substrates;
    F. pre-heating of the sliding layer material
    G. application of the sliding layer material to the surface of the assembled substrates;
    H. drying of the sliding layer material;
    I. additional passes of the bearing elements—for example through previous steps G to H only or through any of steps C to H, as required;
    J. curing (or hardening) of the sliding layer material;
    K. post-process cleaning of the bearing elements.

It will be appreciated from the following description that some of the method steps listed above are optional steps and need not therefore be included in the manufacturing process. It will also be appreciated that any one or more of the steps may be repeated one or more times. The process steps need not be performed in the order in which they are listed above or described below.

As discussed below, bearing elements embodying the present invention are subjected to multiple passes through at least some of the method steps. This has been shown to provide enhanced thickness control of the sliding layer material on the substrate and reduced sagging of the sliding layer material.

(A) Degreasing the Substrate

Optionally, degreasing the substrate, for example to remove excess lubricant following initial forming/machining of the substrate, can be carried out. This may be done using, for example, a solvent-based or aqueous cleaning fluid.

Degreasing of the substrate preferably results in a surface tension of about ≥38 mN/m for aluminium alloy substrates or about ≥40 mN/m for bronze substrates.

(B) Roughening the Surface of the Substrate

Prior to application of the sliding layer material to the substrate, the surface of the substrate is roughened to improve adhesion of the sliding layer material. The surface of the substrate is roughened so that the surface roughness of the surface of the substrate is less than 1 μm (Ra). Some potentially beneficial surface roughness values (Ra and Rz) are discussed above.

The desired surface roughness can be achieved by way of any of a number of suitable roughening processes, including mechanical procedures such as abrading, linishing, micro-machining, machining of micro grooves/channels, sand-blasting, grit-blasting or grinding, and chemical procedures such as phosphating or mild chemical etching of the surface. Other suitable procedures are envisaged and will be readily apparent to the skilled person Grit blasting and/or shot peening the surface of the substrate are believed to be the most suitable methods of preparing a substrate having a surface exhibiting the required surface roughness for bearing elements embodying the present invention.

Particularly suitable materials for use in grit-blasting the surface of the substrate to achieve the desired surface roughness are alumina ($Al_2O_3$) and/or polymeric grit.

Particularly suitable materials for use in shot-peening the surface of the substrate to achieve the desired surface roughness are steel shot, ceramic beads and/or glass beads.

(C) Washing the Substrate

Optionally, after roughening of the surface of the bearing element substrate, washing may be performed to remove residues from the surface of the bearing element substrate.

Residues on the surface of the bearing element substrate following washing will preferably be ≤0.01 mg/part (per individual bearing element substrate) or <1-2 mg/m².

Grit-blasting the surface of the substrate with polymeric grit and/or shot-peening it with beads may be advantageous in that the need for washing of the surface may be reduced or eliminated.

(D) Assembling a Plurality of Bearing Element Substrates for Application of the Sliding Layer Material The sliding layer material may be applied to the surface of each bearing element substrate individually. Preferably, the sliding layer material is applied to a plurality of bearing element substrates simultaneously, or in series, to improve the manufacturing cycle efficiency and increase cycle output.

In a particularly preferred form of the method, a first plurality of bearing element substrates is laid substantially adjacent one another in a first jig with the inner diameter of each adjacent semi-cylindrical bearing element substrate facing upwardly and a second plurality of bearing element substrates is laid substantially adjacent one another in a second jig with the inner diameter of each adjacent semi-cylindrical bearing element substrate facing upwardly. The first and second jigs are then brought together so that the bearing element substrates in the first and second jigs are paired, each pair facing each other to form a substantially complete cylinder, and assembled to form a continuous column of bearing elements in a hollow, substantially cylindrical, arrangement.

(E) Pre-Heating of the Substrates

Optionally, the bearing element substrates may be pre-heated before application of the sliding layer material. This may help to prevent sagging of the sliding layer material relative to the substrate.

Pre-heating of the column of bearing element substrates may be carried out convectively, for example by channelling warming air through the centre of the cylindrical column of bearing elements or, alternatively, by inserting an infrared heat into the centre of the cylindrical column of bearing elements. Other suitable methods and devices for pre-heating the substrates are envisaged and will be readily apparent to the skilled person.

The bearing elements are preferably pre-heated to a surface temperature of between about 30 and about 100 degrees C., preferably between about 40 and about 85 degrees C.

Preheating of the bearing element substrates may be carried out only prior to the application of the first layer of the sliding layer material as discussed in step G below, or prior to the application of more than one, or each one, of layers of the sliding layer material as discussed in step G below.

(F) Pre-Heating of the Sliding Layer Material

Optionally, before the sliding layer material is applied to the bearing element substrates, the sliding layer material may be pre-heated by a heating means. The sliding layer material may be pre-heated to between 40 and 70 degrees, preferably between 40 and 60 degrees C. This may be done only prior to application of the first layer of the sliding layer material discussed in step G below, or prior to the application of more than one, or each one, of layers of the sliding layer material as discussed in step G below.

Matching the temperature of the sliding layer material to the temperature of the bearing element substrates before application of the sliding layer material and/or maintaining the sliding layer material at a constant temperature during application of the sliding layer material to the bearing element substrates may help to ensure uniformity of the sliding layer material on the bearing element substrates. It may also help to maintain a constant viscosity of the sliding layer material and thereby ensure that the characteristics of the process of applying each layer of the sliding layer material and the resultant thickness of the applied layer of the sliding layer material is consistent and repeatable.

A number of suitable methods and devices for pre-heating the sliding layer material are envisaged and will be readily apparent to the skilled person.

(G) Application of the Sliding Layer Material onto the Assembled Substrates

Figure 7:
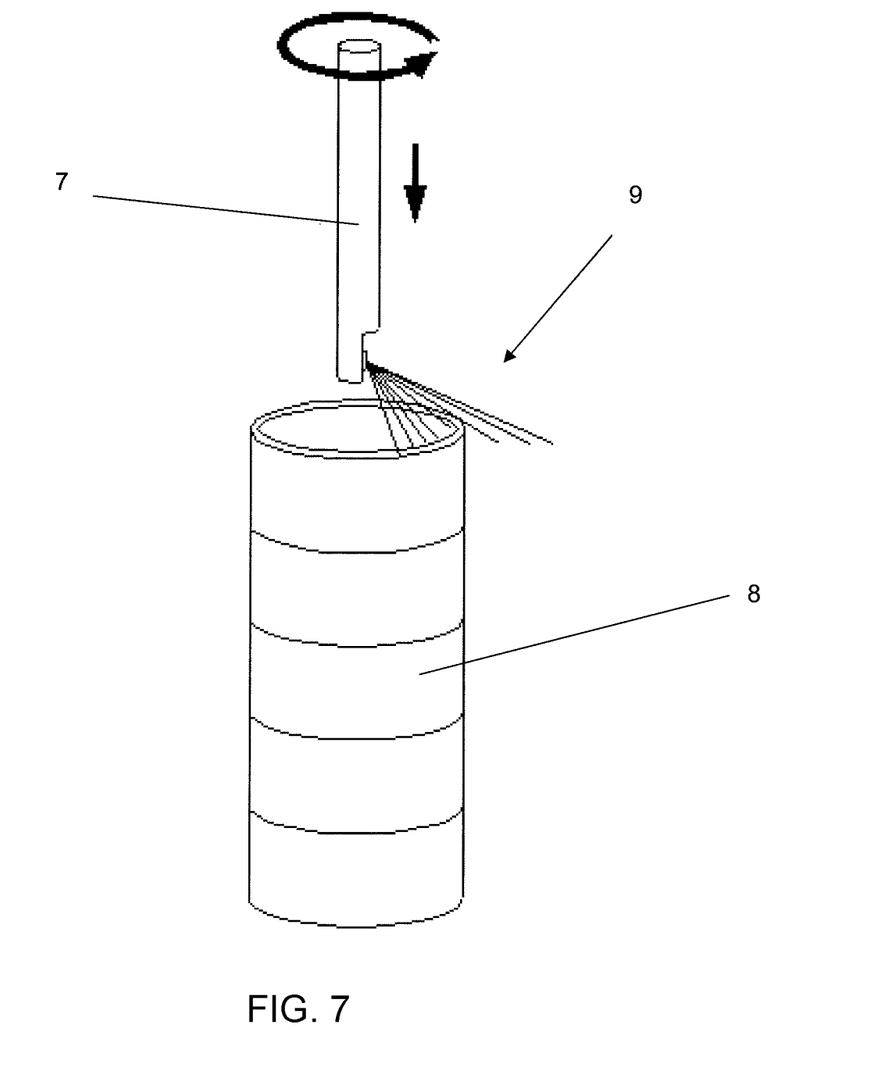
FIG. 7 shows the general arrangement of a spray lance for applying a sliding layer material to the substrate of a stack of bearing elements according to an embodiment of the present invention.

The sliding layer material may be applied to the assembled substrates in one of a number of ways that will be readily apparent to the skilled person. A preferred method of applying the sliding layer material onto the assembled substrates to form bearing elements embodying the present invention is to spray the sliding layer material in liquid form onto the assembled substrates. The sliding layer material is preferably applied by a spray lance or nozzle (FIG. 7).

The spray lance 7 may be moved relative to the surface of the bearing element substrates 8. Alternatively, the surface of the bearing element substrates may be moved relative to the spray lance. In a further alternative, the surface of the bearing element substrates may be moved relative to the spray lance and the spray lance may be moved relative to the surface of the bearing element substrates. In this latter arrangement, the spray lance and the bearing element substrates may be moved in turn while the other is held stationary, or the spray lance and the bearing element substrates may be moved relative to one other simultaneously.

In a preferred form of the manufacturing process, the first and second pluralities of bearing element substrates are held stationary in their respective jigs in a substantially continuous column. The first and second jigs are then positioned so that the substantially cylindrical arrangement of bearing element substrates is orientated vertically as shown in FIG. 7.

The spray 9 from the lance is preferably angled at between about 30 and about 70 degrees to the normal to the column of bearing element substrates. Preferably, the spray cone is divided by the normal to the surface of the bearing element substrates so that, for example, a spray angle of about 50 degrees would form spray cone of about 25 degrees on either side of the normal to the surface of the bearing element substrates.

The spray lance may be rotated relative to the bearing element substrates. Alternatively, the bearing element substrates may be rotated relative to the spray lance. In a further alternative, the bearing element substrates may be rotated relative to the spray lance and the spray lance may also be rotated relative to the bearing element substrates. In this latter arrangement, the spray lance and the bearing element substrates may be rotated in turn while the other is held stationary, or the spray lance and the bearing element substrates may be rotated relative to each other simultaneously.

In a preferred form of the manufacturing process, the spray lance relative to the cylindrical arrangement of bearing element substrates. Rotating the spray lance relative to the substrates may be easier to control than rotating the stack of bearing substrates around a fixed lance as the rotating lance may have lower inertia and or momentum than a rotating stack.

The lance is rotated at between about 500 and about 1500 rpm, preferably at about 1000 rpm.

The rotating spray lance is advanced downwardly into the core of the column of bearing substrates and moved downwardly relative to the stationary bearing element substrates. The spray lance may be advanced continuously relative the cylindrical arrangement of bearing element substrates. Alternatively, the spray lance may be advanced relative the cylindrical arrangement of bearing element substrates between a number of pre-defined spraying locations.

The rotating lance is advanced into the upper end of the column of bearing substrates and then downwardly along the central axis of the column of bearing substrates until it passes beyond the lower end of the column of bearing substrates. It is then withdrawn upwardly along the central axis of the column of bearing substrates until it passes out of the upper end of the column of bearing substrates.

Various operating characteristics of the spray lance and the spraying apparatus to which the lance is coupled may be controlled in order to control the spraying operation. For example, any or all of the following may be varied in order to control the characteristics including the thickness of the sliding layer material applied to the bearing element substrates: the linear velocity of the spray lance; the rotational velocity of the spray lance; the atomising pressure; the fan pressure and the size of the lance aperture.

At least some of the spray parameters may be controllable non-linearly. For example, the lance may be advanced linearly along the bearing substrates at variable velocity. The velocity may vary according to, or in combination with controlled variation of, the spray pressure and/or back pressure in the spraying apparatus. For example, the linear velocity in the centre of the vertical height of the stack may be reduced to create increased back pressure. The linear velocity may also be reduced as the lance approaches the upper and/or lower ends of the stack of bearing substrates.

The spray pressure may be varied during the movement of the spray lance downwardly through the column of bearing element substrates. Further, the rotational velocity of the lance may be kept constant throughout each spraying operation or may be variable.

Figure 8:
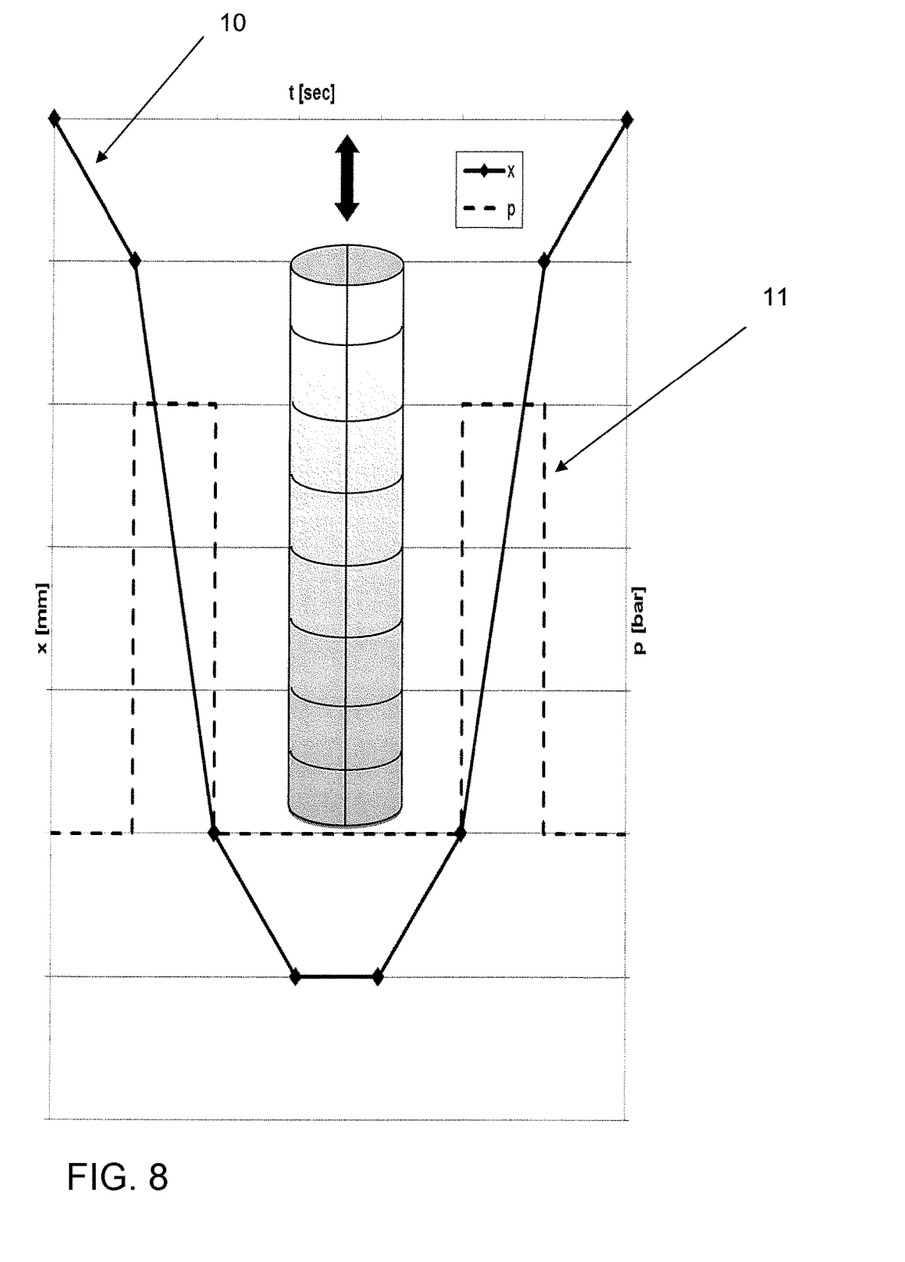
FIG. 8 is a diagram illustrating an example of a variable spray lance velocity profile and a variable spray pressure profile.

The linear velocity of the spray lance and/or the spray pressure may be variable over the duration of each spraying operation. An example profile of the linear velocity of the spray lance and the spray pressure is shown in FIG. 8 in which: the horizontal axis represents time; the left hand vertical axis represents distance in mm; and the right hand vertical axis represents spray pressure in bar. The solid line 10 shows the linear velocity of the spray lance (variation of linear movement of the spray lance with time). The dotted line 11 shows the variation of the spray pressure with time. The figure includes an example of a stack of bearing elements.

It will be appreciated from the solid line profile (linear velocity of the spray lance) shown in the example of FIG. 8 that the linear velocity of the spray lance is increased as it enters the upper end of the column of bearing elements and maintained as it is moved downwardly along the length column of bearing elements. The linear velocity is then decreased as the spray lance is advanced beyond the lower end of the column of bearing elements. The spray lance is held stationary for a period of time below the lower end of the column of bearing elements. The linear velocity of the spray lance is increased as the lance re-enters the lower end of the column of bearing elements and maintained as it is moved upwardly along the length column of bearing elements. The linear velocity of the spray lance is then reduced again as the spray lance is withdrawn from the upper end of the column of bearing elements.

It will also be appreciated from the dotted line profile (spray pressure) shown in the example of FIG. 8 that: the spray pressure is at a minimum (or switched off) when the spray lance enters the upper end of the column of bearing elements; the spray pressure is at a maximum as the spray lance is moved downwardly along the length column of bearing elements; the spray pressure is at a minimum (or switched off) as the spray lance is advanced beyond the lower end of the column of bearing elements; the spray pressure remains at a minimum (or switched off) as the spray lance re-enters the lower end of the column of bearing elements; the spray pressure is at a maximum as the spray lance is moved upwardly along the length column of bearing elements; and the spray pressure is reduced to a minimum (or switched off) as the spray lance is withdrawn from the upper end of the column of bearing elements.

In the example profile of FIG. 8, the linear velocity profile and the spray pressure profile are symmetrical and spraying of the sliding layer material onto the bearing elements occurs both as the spray lance is advanced downwardly relative to the column or bearing elements and as the spray lance is advanced upwardly relative to the column or bearing elements. It will be appreciated that the either, or both, of the velocity profile and the spray pressure profiles may not be symmetrical. It will further be appreciated that spraying of the sliding layer material may occur only during downward or upward movement of the spray lance relative to the column of bearing elements.

The spray lance may be rotated during both, or only, one of the upward and downward motions relative to the column of bearing elements. The spray lance may be rotated in the same or in opposite directions during the upward and downward motions of the spray lance relative to the column of bearing elements.

(H) Drying of the Sliding Layer Material

After spraying of the sliding layer material described in step G, a drying (or flash-off) step is performed in which the sliding layer material is dried. The drying step preferably leaves a continuous, thin-film, of the sliding layer material on the substrate and results in substantially dry-to-touch bearing elements.

Drying of the sliding layer material may be achieved by one of a number of suitable methods. The bearing elements may be dried while the bearing elements remain in the cylindrical configuration. Alternatively, the first and second jigs may be separated and the first and second pluralities of the bearing elements dried separately.

In one suitable drying method, warm air is channelled through the centre of the cylindrical column of bearing elements and passes over the surfaces of the bearing elements so as to dry the sliding layer material convectively. In another suitable drying method, a heat source, such as an infrared heat source, is passed along the centre of the cylindrical column of bearing elements. In a further suitable drying method, drying of the sliding layer material is achieved by heating the bearing elements from the back, through the jig, for example using a suitable heating element, such as an induction heater. Other suitable methods and devices for drying the sliding layer material are envisaged and will be readily apparent to the skilled person.

In an embodiment of the bearing element in which a solvent is included in the sliding layer material fluid, the majority of the solvent is driven off during the drying step so as to leave a continuous thin film of the sliding layer material on the substrate.

(I) Additional Passes of the Bearing Elements

In a manufacturing process embodying the present invention, the bearing elements are subjected to at least three passes through the spraying step (Step G) and the drying step (Step H), the at least three passes consisting of the following steps:

(I1a) a first spraying step (as discussed in Step G);
(I1b) a first drying step (as discussed in Step H);
(I2a) a second spraying step;
(I2b) a second drying step;
(I3a) a third spraying step; and
(I3b) a third drying step.
Steps I1a and I1b form the first pass (as discussed in Steps G and H). Steps I1a and I2b form the second pass. Steps I3a and I3b form the third pass.

After the first pass, the bearing elements are brought back together (if the column was disassembled for drying and/or washing) to form a column which is positioned vertically. A second pass consisting of spraying step (I2a) and drying step (I2b) is then performed in the manner described in Steps G and H above.

After the second pass, the bearing elements are brought back together (if the column was disassembled for drying and/or washing) to form a column which is positioned vertically. A third pass consisting of the spraying step (I3a) and drying step (I3b) is then performed in the manner described in Steps G and H above.

Any number of additional passes may be performed as required to achieve and control a desired thickness of the sliding layer material.

Preferably, between each of the at least three passes, the column of bearing elements is indexed (i.e. moved or rotated through a predetermined distance or angle) so that the second (I2a) and third spraying steps (I3a) begin at a different location on the internal diameter of the bearing elements from location on the internal diameter of the bearing elements at which the first spraying operation (Step G) was begun.

Preferably, the stack of bearing elements is indexed after each of pass by an amount that is equal to 360 degrees divided by the number of passes to be performed. For example, in a process in which three passes are to be performed, the stack of bearing elements will be indexed by about 120 degrees after each pass before the next pass begins. In a process in which four passes are performed, the stack of bearing elements will be indexed by about 90 degrees after each pass before the next pass begins.

Indexing may be achieved by any suitable means, for example by a stepper motor. Other suitable means are envisaged and will be readily apparent to the skilled person.

Indexing the bearing elements may help to provide improved control over the thickness of the sliding layer material and greater uniformity of the thickness of the at least three layers of the sliding layer material.

The bearing elements may be washed following one, or following each pass.

It may be beneficial to vary the parameters of the spraying and/or drying step between any two of the passes or between each of the at least three passes. It may, for example, be beneficial to vary any, some or all of the following: the rotational velocity of the spray lance; the direction of rotation of the spray lance; the linear velocity of the spray lance; the size of the spray lance aperture; the spray pressure of the sliding layer material; the spray angle of the spray cone relative to the normal to the surface of the bearing elements; the duration of the spraying step; the duration of the drying step; and the temperature of the heating/drying means used to dry the sliding layer material.

(J) Curing (or Hardening) of the Sliding Layer Material

After spraying of the sliding layer material and drying of the sliding layer material, the sliding layer material is cured. Curing hardens the polymeric material and causes cross-linking of the polymer chains. Curing gives the sliding layer material the desired sliding or running properties.

Curing of the sliding layer material may be achieved by one of a number of suitable methods. The bearing elements may be cured while the bearing elements remain in the cylindrical configuration. Alternatively, the first and second jigs may be separated and the first and second pluralities of the bearing elements cured separately by the same or by separate curing devices.

In one suitable curing method, warm air is channelled through the centre of the cylindrical column of bearing elements and passes over the surfaces of the bearing elements so as to cure the sliding layer material convectively. In another suitable curing method, a heat source, such as an infrared heat source, is passed along the centre of the cylindrical column of bearing elements. In a further suitable curing method, curing of the sliding layer material is achieved by heating the bearing elements from the back, through the jig, for example using a suitable heating element, such as an induction heater. Other suitable methods and devices for curing the sliding layer material are envisaged and will be readily apparent to the skilled person.

Curing may be carried out in a furnace, for example a batch furnace or a tunnel furnace, or another suitable heating device. The bearing elements are preferably cured at a temperature of greater than 150 degrees C. Where the bearing elements are cured in a furnace, it is preferable that the column of bearing elements is separated and the two jigs positioned so that each of first and second pluralities of bearing elements is orientated horizontally with their inner (bearing) surfaces facing upwardly. Alternatively, the bearing elements may be separated and put on trays or a conveyer belt, in the case of a tunnel furnace.

It has been found that only a single curing step following the final pass (i.e. after the third, or final, drying step) is required. However, it may also be beneficial to include a curing step after one or more of the earlier passes and may be beneficial to include a curing step after each pass before the next pass begins.

(K) Post-Process Washing of the Bearing Elements.

Optionally, the bearing elements may be washed after one or more of the steps of the manufacturing process. The bearing elements are preferably washed with an aqueous solution. Washing of the bearing elements is preferably carried out following the step of curing the sliding layer material. Additional washing steps may be performed, as required, after other steps in the manufacturing process.

Figure 9:
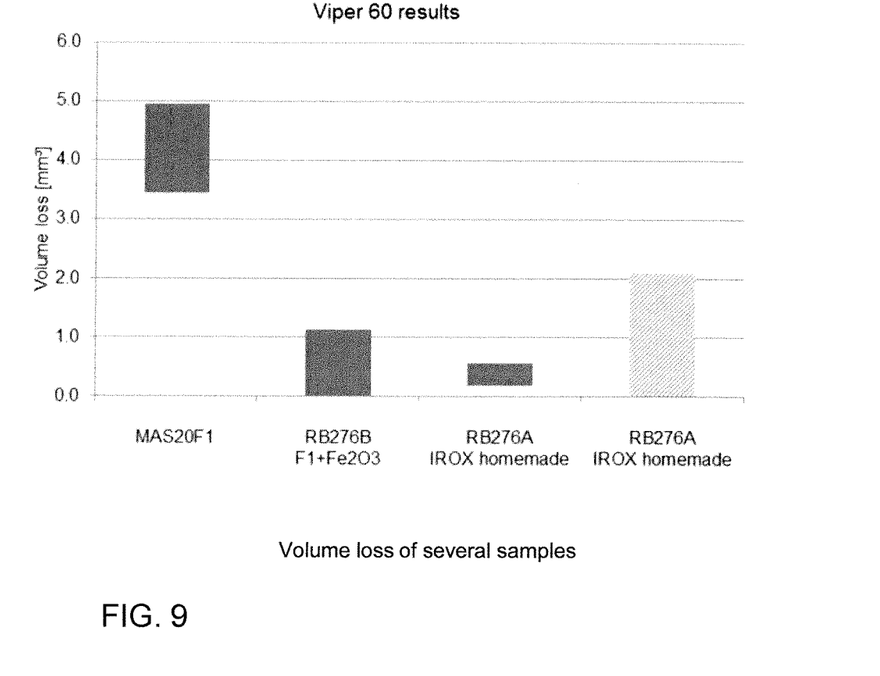
FIG. 9 is a diagram illustrating the different volume loss of several samples.

FIG. 9 shows that the iron oxide $Fe_2O_3$ improves the F1 formulation and the homemade IROX (according to the recipe in the FM patent) is also better in terms of wear.

The invention claimed is:

1. A bearing element, comprising:
    a bearing element substrate; and
    a sliding layer applied to a surface of the bearing element substrate, the sliding layer being formed of a sliding layer material;
    wherein a surface roughness (Ra) of the surface of the bearing element substrate is less than 1 µm;
    wherein a surface roughness (Rz) of the surface of the bearing element substrate is less than 1 µm;
    wherein the sliding layer material includes:
        a polymeric material; and
        iron oxide; and
    wherein the sliding layer has at least three layers of the sliding layer material.

2. A bearing element according to claim 1, wherein the sliding layer material comprises one of $Fe_2O_3$ or $Fe_2O_4$.

3. A bearing element according to claim 1, wherein the sliding layer material comprises iron oxide in one of powder form or flaked form.

4. A bearing element according to claim 3, wherein the sliding layer material comprises iron oxide particles having an average particle size of between 0.5 µm and 10 µm.

5. A bearing element according to claim 3, wherein the sliding layer material comprises iron oxide flakes having an average particle size of between 0.5 µm and 15 µm.

6. A bearing element according to claim 3, wherein the sliding layer material comprises iron oxide flakes having an average aspect ratio of about 1:4.

7. A bearing element according to claim 3, wherein the sliding layer material comprises iron oxide flakes randomly arranged and randomly orientated throughout the polymeric material.

8. A bearing element according to claim 1, wherein the thickness of each of the at least three layers of the sliding layer material is substantially equal.

9. A bearing element according to claim 1, wherein the total thickness of the sliding layer material is between about 3 µm and about 12 µm.

10. A bearing element according to claim 1, further comprising a steel back underlying the bearing element substrate.

11. A bearing element according to claim 1, wherein the substrate comprises an iron, aluminium or bronze alloy.

12. A bearing element according to claim 1, wherein the polymeric material comprises polyamide imide.

13. A bearing element according to claim 1, wherein one of:
    at least one of the at least three layers of the sliding layer material comprises a different percentage by volume of iron oxide than at least one other layer of the sliding layer material;
    a percentage volume of iron oxide in a middle layer of the sliding layer material is different than a percentage volume of iron oxide in at least one outer layer of the sliding layer material; or
    a percentage volume of iron oxide in the sliding layer decreases with each layer of the sliding layer material from the substrate.

14. A method of manufacturing a bearing element, comprising:
    providing a bearing element substrate;
    roughening a surface of the bearing element substrate to have a surface roughness (Ra) which is less than 1 µm and a surface roughness (Rz) less than 1 µm;
    providing a sliding layer material having:
        a polymeric material; and
        iron oxide;
    applying the sliding layer material to the bearing element substrate to form a sliding layer, wherein the sliding layer material is applied to the bearing element substrate in at least three passes, each pass including:
        applying a layer of the sliding layer material to the bearing element substrate; and
        drying the layer of the sliding layer material; and
    curing the sliding layer material.

15. A method of manufacturing a bearing element according to claim 14, wherein the sliding layer material is sprayed onto the substrate.

16. A method of manufacturing a bearing element according to claim 14, wherein the sliding layer material is sprayed onto the substrate by a spray lance which is rotated relative to the substrate.

17. A method of manufacturing a bearing element according to claim 16, wherein a plurality of semi-cylindrically shaped bearing element substrates is arranged so as to form a hollow, substantially cylindrical, stack of bearing element substrates, and the rotating spray lance is advanced linearly along the cylindrical stack so as to apply the sliding layer material to the plurality of semi-cylindrically shaped bearing element substrates in a single operation.

18. A method of manufacturing a bearing element according to claim 17, wherein the spray lance is angled at between about 30 and about 70 degrees to a normal to the stack of bearing element substrates.

19. A method of manufacturing a bearing element according to claim 18, wherein a spray cone produced by the spray lance is divided equally by the normal to the surface of the bearing element substrates.

20. A method of manufacturing a bearing element according to claim 17, wherein the rotating spray lance is advanced linearly along the stack of bearing element substrates at variable linear velocity.

21. A method of manufacturing a bearing element according to claim 17, further comprising indexing the stack of bearing elements between each pass.

22. A method of manufacturing a bearing element according to claim 16, wherein the spray lance is rotated at between 500 and 1500 rpm.

23. A method of manufacturing a bearing element according to claim 14, wherein the thickness of each of the at least three layers of the sliding layer material is substantially equal.

24. A method of manufacturing a bearing element according to claim 14, wherein one of:
- at least one of the at least three layers of the sliding layer material comprises a different percentage by volume of iron oxide than at least one other layer of the sliding layer material;
- wherein the percentage volume of iron oxide in a middle layer of the sliding layer material is different to the percentage volume of iron oxide in at least one outer layer of the sliding layer material; or
- wherein the percentage volume of iron oxide in the sliding layer decreases with each layer of the sliding layer material from the substrate.

25. A method of manufacturing a bearing element according to claim 14, further comprising degreasing the surface of the bearing element substrate.

26. A method of manufacturing a bearing element according to claim 14, further comprising washing the surface of the bearing element substrate.

27. A method of manufacturing a bearing element according to claim 14, further comprising pre-heating the bearing element substrate before at least one pass of the bearing element substrate.

28. A method of manufacturing a bearing element according to claim 14, further comprising pre-heating of the sliding layer material before at least one pass of the bearing element substrate.

29. A semi-cylindrical bearing element comprising:
- a bearing element substrate; and
- a sliding layer applied to a surface of the bearing element substrate, the sliding layer being formed of a sliding layer material;
- wherein a surface roughness (Ra) of the surface of the bearing element substrate is less than 1 µm;
- wherein a surface roughness (Rz) of the surface of the bearing element substrate is less than 1 µm;
- wherein the sliding layer material comprises:
- a polymeric material; and
- iron oxide; and
- wherein the sliding layer comprises at least three layers of the sliding layer material.

* * * * *